Oct. 21, 1941.    R. B. FAGEOL    2,259,440
AUTOMOBILE BUMPER GUARD
Filed Sept. 18, 1939    3 Sheets-Sheet 1

INVENTOR
ROLLIE B. FAGEOL
BY
James M. Abbett
ATTORNEY.

Oct. 21, 1941.   R. B. FAGEOL   2,259,440
AUTOMOBILE BUMPER GUARD
Filed Sept. 18, 1939   3 Sheets-Sheet 2

INVENTOR
ROLLIE B. FAGEOL
BY
James M. Abbott
ATTORNEY

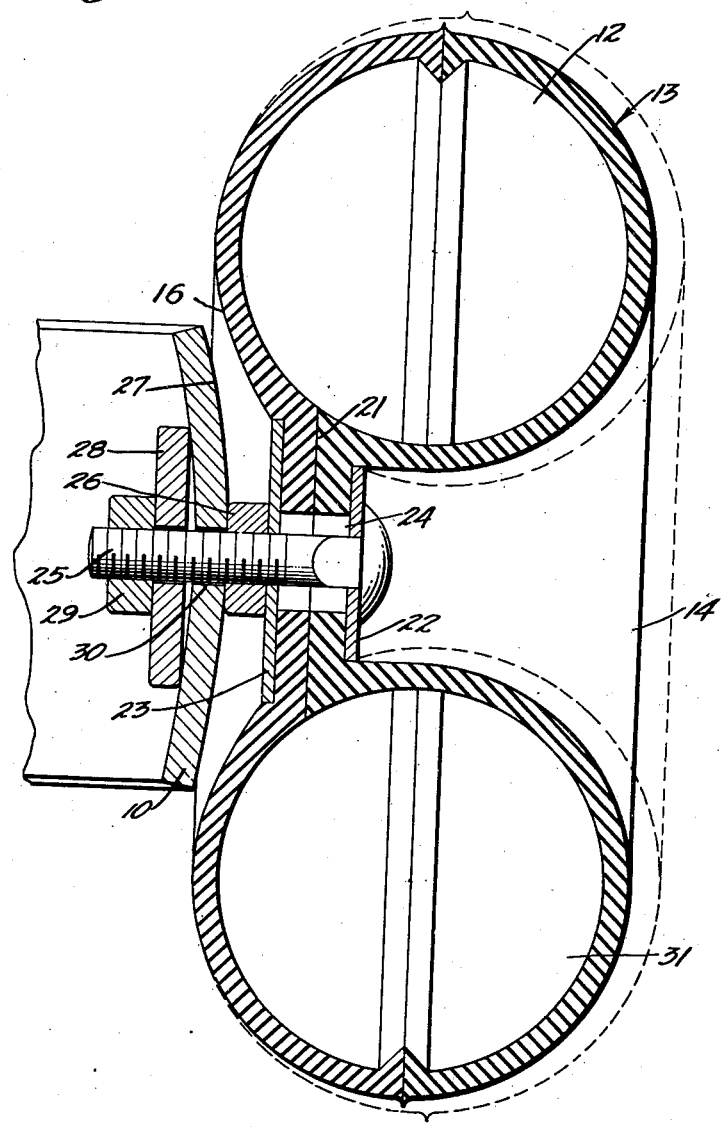

Patented Oct. 21, 1941

2,259,440

UNITED STATES PATENT OFFICE 2,259,440

AUTOMOBILE BUMPER GUARD

Rollie B. Fageol, Beverly Hills, Calif.

Application September 18, 1939, Serial No. 295,437

6 Claims. (Cl. 293—55)

This invention relates to automobile accessories and particularly pertains to an automobile bumper guard.

In the structure shown in my application, as above identified, and other applications, which are now pending, it has been found desirable to provide a yieldable and fully resilient impact element to be mounted upon the impact face of an automobile bumper. It is well known that the theory of a resilient automobile bumper is to prolong the period during which a moving body comes to rest after impact. In accomplishing this result the automobile bumper flexes under impact. By the use of the present invention the period of impact is prolonged so that the vehicle will come to rest gradually and so that the force of impact will be transmitted to the bumper guard and to a degree dissipated prior to the time that this force is directly transmitted to the bumper bar. It is the principal object of the present invention, as distinguished from the invention of my former applications, to provide a resilient pneumatic cushion member which will absorb a maximum impact shock prior to directly transmitting this shock to the bumper bar, the structure being provided with means whereby the bumper guard may be conveniently and rigidly supported upon the impact face of an automobile bumper and whereby the buffer will undergo a maximum amount of deflection in absorbing the initial force of impact with the colliding body.

It is a further object of the invention to provide a pneumatic buffer element which may be readily manufactured and which when assembled will maintain its sealed condition and will yieldably resist direct impact while being of a construction which will permit it to be easily unhooked from another bumper with which it has collided.

The present invention contemplates the provision of an annulus made of rubber and capable of stretching in all directions, said structure being adjustably and rigidly secured to the front face of an automobile bumper bar in a manner tending to hold the annulus in a sealed condition and rigidly so that irrespective of the force applied against it or the direction of said force the buffer structure will not be loosened and will readily deflect to accommodate this force.

The invention is illustrated by way of example in the accompanying drawings, in which:

Fig. 4 is a view in transverse section similar to that shown in Fig. 3 and indicating another form of bumper.

Figure 1:
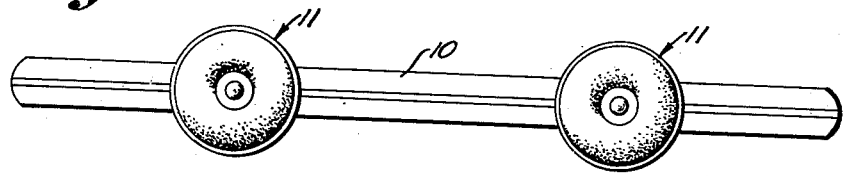
Figure 1 is a view in elevation showing the application of the present invention to a single bar automobile bumper.
Figure 2:
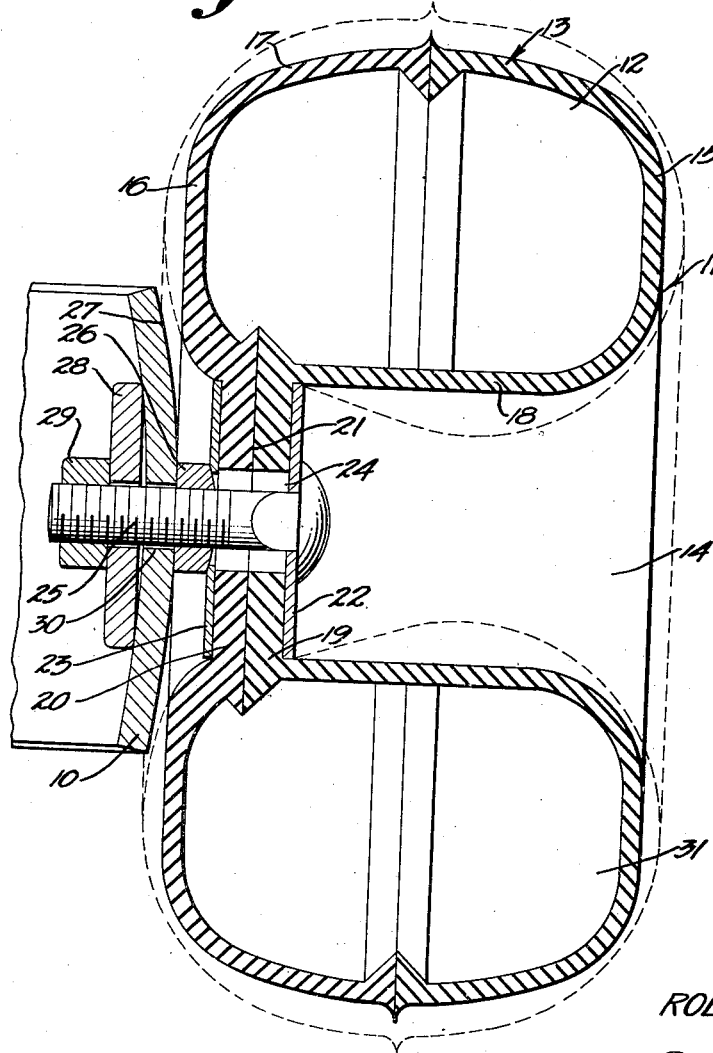
Fig. 2 is an enlarged view in transverse section through a form of an automobile bumper with which the present invention is concerned.

Referring more particularly to the drawings, 10 indicates a bumper bar which is supported transversely of the forward end of an automobile frame. A pair of bumper guards 11 are secured upon the impact face of the bumper bar and are presented for impact with colliding vehicles. The construction of the bumper guards is more particularly disclosed in Figs. 2 and 3 of the drawings. Referring particularly to Fig. 2 of the drawings it will be seen that the buffer comprises an annulus 12 which has a wall 13 substantially oval in cross-section, and a central well 14 around which the body of the annulus occurs. In detail the section represented by the wall 13 comprises a front flat face 15, a rear substantially flat face 16, an outer circumferential wall portion 17, and an inner cylindrical wall portion 18. The wall portion 18 is formed at the bottom of the well 14 with a transverse web 19. This web is formed integral with the wall 18 and abuts against a complementary web 20 which is formed integral with the back wall 16. The webs 19 and 20 abut against each other against a transverse plane 21, and in the process of manufacture are vulcanized together. The margins of these walls are feathered, thus insuring a firm vulcanized joint. Mounted within the well 14 of the annulus and lying flat against the web 19 is a washer 22. A complementary washer 23 is mounted against the back face of the web portion 20. Attention is directed to the fact that the back face of the web portion 20 is inset from the plane of the back face 16 of the annulus. A central opening 24 is formed through the two webs 19 and 20 and accommodates the shank of the bolt 25. The opening 24 is of a materially greater diameter than the diameter of the bolt, thus allowing for compression and deformation of the webs 19 and 20. It is to be understood that the annulus forming a part of the bumper guard is made of rubber which is preferably devoid of reinforcing fabric and which is a grade of gum rubber capable of stretching and deforming under the force of impact with a colliding object.

It is usual practice at present to construct automobile bumpers with a vertically convex front face, and it is necessary to mount the present bumper guard against this front face in a manner to insure that the annulus will be free to flex and that the entire bumper guard structure will not loosen on its mountings. In the present instance this is accomplished by threading the bolt 25 from its outer end to a point lying within the passageway 24. Mounted upon this threaded portion is a nut 26 which when tightened on the bolt will bear against the washer 23. Thus, the washers 22 and 23 will be rigidly clamped at opposite sides of the web structure including webs 19 and 20. The inner face of the nut 26 bears against the convexed face 27 of the bumper bar 10 and acts to space the buffer structure from the front face 27 of the bumper bar so that there will be sufficient clearance to permit a desirable flexure of the annulus prior to the time when the back wall 16 of the buffer will be forced directly against the convexed face 27 of the bumper. The bolt 25 extends through a washer 28 which rests against the concaved back face of the bumper bar and is there held by one or more nuts 29.

Figure 3:
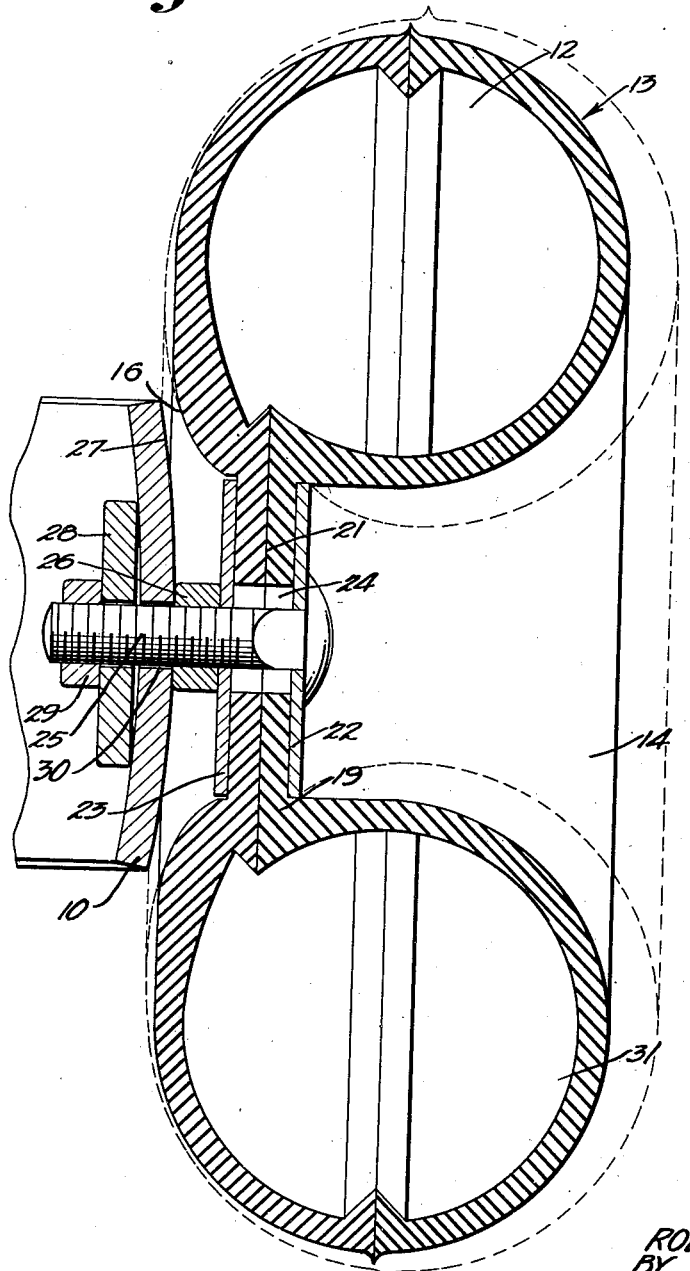
Fig. 3 is a view in transverse section showing another form of the present invention.

In the form of the invention shown in Fig. 3 of the drawings, the construction is the same save that the annulus wall 13 is substantially circular in cross-section. It will be evident that while the transverse section of the buffers is fundamentally the same that in the form of the invention shown in Fig. 2 of the drawings the horizontal depth of the buffer structure is greater than that shown in Fig. 3, thus making it possible for a greater degree of deformation to take place in the buffer before the colliding object would abut against the head of the bolt 25.

In operation and use of the present invention the bumper guards of the design shown in either Fig. 2 or Fig. 3 are mounted upon the bolts 25 by inserting the bolts through the washer 22, then through the opening 24 in the webs 19 and 20 and then through the washer 23. The washers are then drawn tightly together by the nut 26, after which the bolt 25 is inserted through the opening 30 in the bumper bar 10. The washer 28 is then placed on the bolt 25 and the nut 29 is then tightened. It will thus be recognized that when the bumper guard is mounted in this manner the back face 16 of the annulus will be held spaced from the impact face of the bumper bar 10 and that the nut 26 will rigidly hold the annulus as well as act to space the buffer from the bumper bar. This insures that the buffer will be securely clamped and held independently of any action to clamp the structure upon the bumper, and that furthermore, the buffer will be rigidly clamped on the bumper independently of the clamping action of the rubber annulus. Due to this arrangement there will be no opportunity for the structure to become loosened on the bumper bar, and at the same time the buffer will be held rigidly to withstand impact. In the event of collision the buffer will be interposed between the colliding object and the bumper bar. The result will be that the colliding object will encounter the front face 16 of the buffer and will act to compress the annulus. This will deform the wall 13 of the annulus and will change the shape of the compartment 31 within which air under suitable pressure is sealed. Under extreme conditions the entire annulus will be flexed with relation to its rigidly held webs 19 and 20 so that its back face 16 will encounter the front convexed face 26 of the bumper bar 10. Further force will tend to flatten the annulus and to distend it circumferentially. It will be recognized that this distension and deformation may continue until the colliding object has encountered the head of the bolt 25. If that extreme condition takes place the force of collision will be thereafter transmitted directly to the bumper bar 10 through the bolt and the nut 26. In the event that the collision occurs with the bumper of another automobile the annulus may slip over the colliding bumper and hook with it. If such a condition occurs the vehicles may be readily separated since the annulus of the buffer will be deformed easily to slip back over the colliding bumper bar so that the bumpers may be separated without injury to either bumper. It will be seen that in the event a bumper guard 11 strikes a flat surface squarely, the surface being wider than the well 14, the air within the well will be entrapped and will form a cushion as it is compressed. This will additionally absorb the shock of impact.

It will thus be seen that the structure here disclosed comprises simple and effective means to supplement the action of an automobile bumper in protecting an automobile against collision and for minimizing the shock of collision while providing a structure which interposes a non-metallic resilient and pneumatic element between the colliding parts.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A bumper guard comprising an all-rubber annulus providing a central well presenting a forward opened end circumscribed by a sealed compartment forming a pneumatic cushion, a transverse web formed across the rear end of the well to close the same and formed integral with the annulus, and means engaging the web and securing the annulus to the face of a bumper bar.

2. A bumper guard adapted to be mounted on the face of an automobile bumper, which guard comprises a cushion member having a resilient back wall, a circumferentially extending pneumatic annular compartment carried by the back wall and extending forwardly thereof, the inner wall of said compartment defining a central well opened at its forward end, and means passing through the back wall and the bumper bar to secure the guard to the bumper bar.

3. The combination as set forth in claim 2 and means associated therewith for spacing the bumper guard from the impact face of the bumper bar.

4. In combination with an automobile bumper, a guard adapted to be mounted on the impact face thereof, said guard being an all-resilient element having a sealed circular pneumatic cushion, the walls of which are formed of rubber and include a transverse back wall having a central opening therethrough, a plate against the forward face of said transverse wall, a plate against the rear face of said transverse wall, a bolt passing through central openings of said plates, a nut on the bolt to clamp the plates in gripping relation to the transverse wall, the end of the bolt being of sufficient length to extend through an opening in a bumper bar, and a nut on the extension end of the bolt and cooperating with the first named nut to clamp the bolt on the bar.

5. In combination with an automobile bumper, a bumper guard comprising a resilient pneumatic cushion element adapted to be disposed in advance of the impact face of a bumper bar and being of a diameter greater than the vertical width of said bar, the cushion element having a vertical back wall lying in a plane substantially parallel with the impact face of the bumper bar and being formed integral with two concentric forwardly extending wall sections connected at their forward edges with an annular front wall section whereby a pneumatic compartment will be formed within the cushion member, the inner concentric wall being of a diameter to form a well extending horizontally from the back wall and opened at its forward end, a fastening washer disposed within the well and resting against the transverse back wall, a second fastening washer disposed against the back face of the back wall, the back wall and the two washers being formed with aligned openings therethrough, a bolt extending rearwardly through said openings and having a head resting against the front washer, a nut mounted upon the bolt and engaging the back washer to clamp the two washers in a gripping position upon the back wall, said bolt having an extension to project through an opening in a bumper bar and to permit said washer to rest against the front impact face thereof, a washer on the bolt resting against the back face of the bumper bar, and a nut on the bolt cooperating with the first named nut to clamp the structure on the bumper bar.

6. The combination as set forth in claim 5, the rear wall of the cushion member being recessed in the area of the rear washer whereby the cushion member will be offset with relation to the face of the bumper bar.

ROLLIE B. FAGEOL.